Figure 2A:
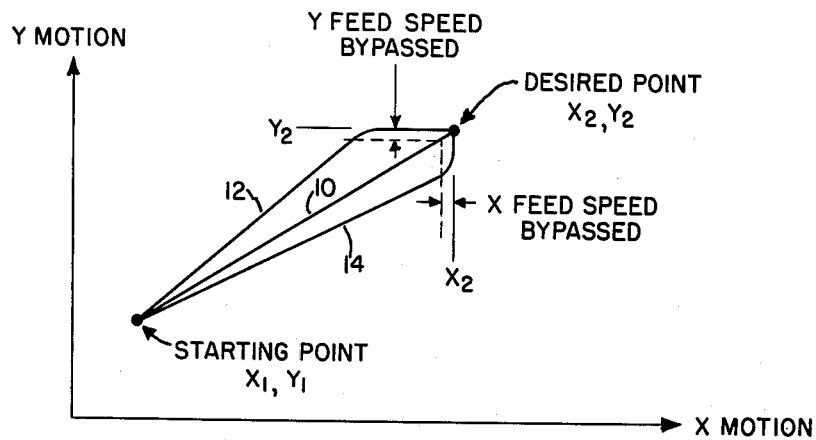

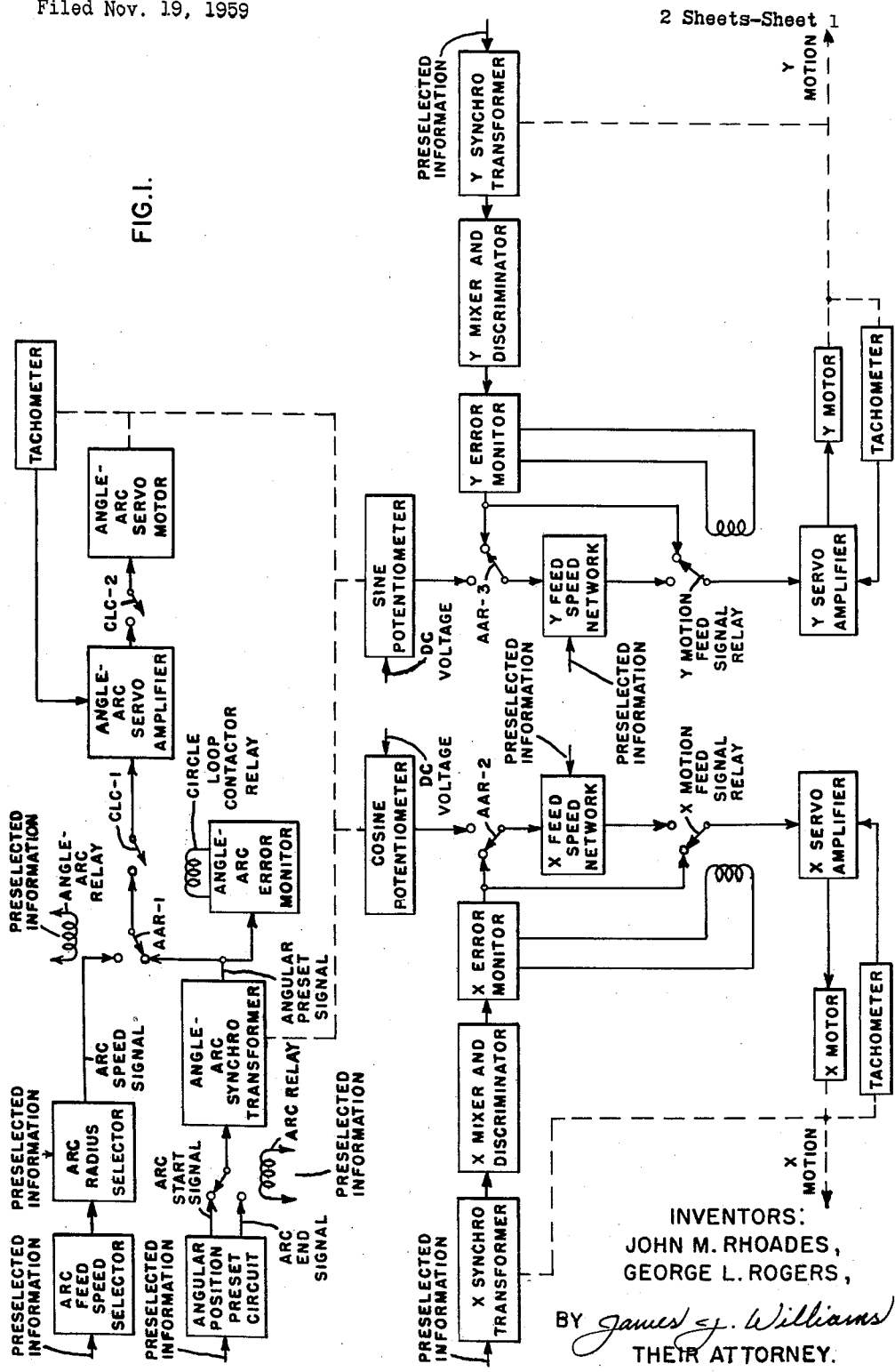

May 15, 1962 J. M. RHOADES ETAL 3,035,216
ANGLE AND ARCUATE POSITION CONTROL SYSTEM
Filed Nov. 19, 1959 2 Sheets-Sheet 2

INVENTORS:
JOHN M. RHOADES,
GEORGE L. ROGERS,
BY James J. Williams
THEIR ATTORNEY.

United States Patent Office 3,035,216
Patented May 15, 1962

3,035,216
ANGLE AND ARCUATE POSITION
CONTROL SYSTEM
John M. Rhoades and George L. Rogers, Waynesboro,
Va., assignors to General Electric Company, a corporation of New York
Filed Nov. 19, 1959, Ser. No. 854,194
6 Claims. (Cl. 318—162)

The invention relates to a position control system that provides motions along two lines, and particularly to such a position control system that provides resultant motions along a path that forms either an angular straight line or an arc with respect to the two lines of motion.

Position control systems capable of providing motion along two lines, such as motion along mutually perpendicular X and Y lines, are known in the art and are used in many applications. For example, such X and Y position control systems are frequently used in the machine tool industry to perform machining or milling operations on a piece of work. Thus, a rectangular slot can be milled or machined in a piece of work in response to stored programed information indicative of the desired length, width, and configuration of the slot. When the stored information is read out, the machine tool may be made to respond to the control system and move forward along one length of the slot in say an X direction, then forward along one width of the slot in the Y direction, then back along the other length of the slot in the X direction, and finally back along the other width of the slot in the Y direction to the point of beginning. However, such position control systems are usually limited to motions along the two mutually perpendicular X and Y lines. If motion along a path that forms either an angular straight line (that is a straight line at an angle), or an arc with respect to the two lines is desired, then the path must comprise a series of small step-like motions to provide the desired angular or arcuate path. However, such a path requires a relatively long time to be followed and may be too rough or jagged for some purposes.

Accordingly, an object of the invention is to provide a novel angle and arcuate position control system.

Another object of the invention is to provide a novel angle and arcuate position control system for use with a position control system that is only capable of providing motion along two mutually perpendicular lines.

Another object of the invention is to provide a novel control system that provides smooth angular or arcuate resultant motion with a control system only capable of providing motion along mutually perpendicular lines.

In accordance with one embodiment of the invention, the control system comprises a generator that produces a sinusoidally varying signal when driven and a generator that produces a cosinusoidally varying signal when driven. These generators are arranged so that the ratio of their signals is tangential. Drive means are coupled to the two generators for simultaneously driving the generators in response to an applied signal. Signals derived from the sinuosoidal generator are applied to the Y portion of an X and Y motion position control system, and signals derived from the cosinusoidal generator are applied to the X portion of the X and Y motion position control system. If resultant motion along a path that forms an angular straight line with respect to the two lines of motion is desired, the generators are driven to a predetermined position and stopped. At this position, the generator signals have the fixed ratio needed to provide simultaneous X and Y motion along the desired angular path. If resultant motion along a path that forms an arc with respect to the two lines of motion is desired, the generators are driven so that their signals have the variable ratio needed to provide simultaneous X and Y motion along the desired arcuate path.

Figure 2B:
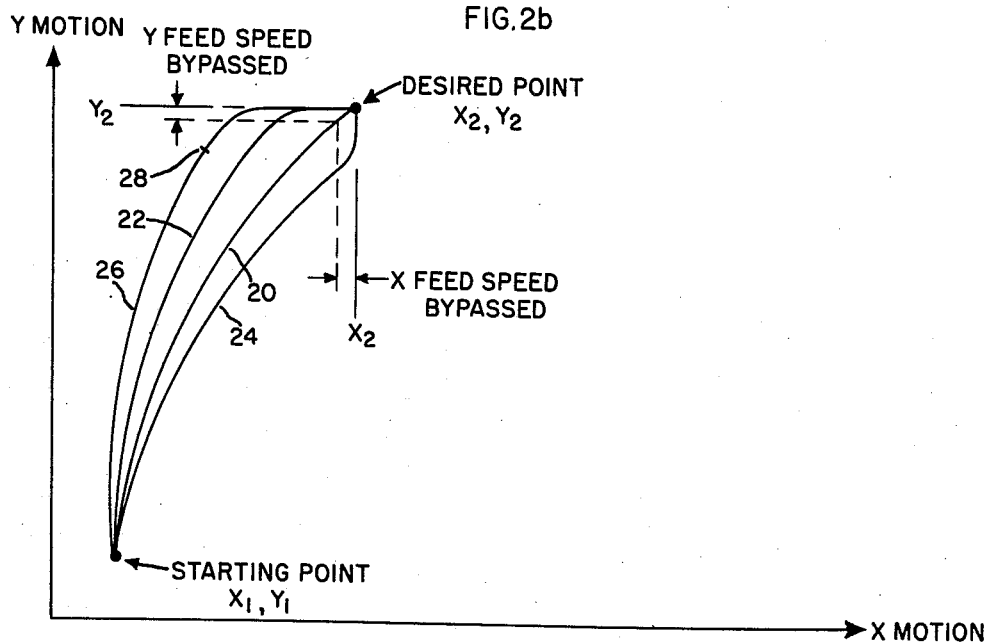

The invention will be better understood from the following description taken in connection with the accompanying drawing, and its scope will be pointed out in the claims. In the drawing:

FIGURE 1 shows a general block diagram of one embodiment of the angle and arcuate position control system in accordance with the invention as used with a known X and Y motion position control system; and FIGURES 2a and 2b show graphs for explaining the operation of certain aspects of the invention.

Circuit Description

The circuit shown in block diagram form in FIGURE 1 may be generally divided into two parts. The first part comprises a known X and Y motion position control system. The second part comprises, in accordance with the invention, an angle and arcuate position control system.

The known X and Y position control system may be further divided into two parts, namely an X motion part and a Y motion part. Both of these parts are substantially identical, and the description of one applies to the description of the other. The only difference is that the two motions are usually, but not necessarily, along lines which are mutually perpendicular to one another. The X motion part of the known position control system comprises an X selsyn or synchro transformer or transformers each of which has stator windings and an associated rotor winding. As is known, an alternating current signal applied to the stator windings induces an alternating current signal in the associated rotor winding. The applied alternating current signal may be derived from preselected digital information so as to have the characteristics needed to bring about the desired positioning. Such a derivation may be effected by any of the known suitable digital to analog converters. As the rotor winding is moved toward a certain position for a given applied signal, the signal induced in the rotor winding falls toward zero. As is also known, a plurality of such transformers may be used to provide more accurate positioning. Signals derived from the rotor windings of the selsyn transformers are applied to an X mixer and discriminator circuit. The mixer part of this circuit serves to select signals from the rotor windings in a sequential manner if there is more than one transformer. Signals from the mixer part of the circuit are then applied to the discriminator part of this circuit, the discriminator part being provided to convert the usually alternating current signals from the mixer part of the circuit into direct current signals. The magnitude of the discriminator signals is proportional to the magnitude of the alternating current mixer signals. The selsyn transformers, the mixer circuit, and the discriminator circuit just described are known in the art. A further explanation of such circuits and their operation may be found in United States Patent Number 2,764,720 issued to L. U. C. Kelling on September 25, 1956. Signals from the X mixer and discriminator circuit are then applied to an X error monitor circuit. This circuit may provide, by means of an X motion feed signal relay, a switching action when the signals from the discriminator circuit fall below a certain predetermined magnitude. A circuit such as the error monitor circuit is also known in the art, such a circuit being shown in United States Patent Number 2,848,670 issued to L. U. C. Kelling et al. on August 19, 1958. The signals which pass through the X error monitor circuit are applied through relay contacts AAR–2 (or relay contacts AAR–3 for the Y part) to an X feed speed network. The X feed speed network may, in one form, combine an analog feed speed signal, derived from preselected digital information that is indicative of the rate at which the object is to be moved, with the signal from the X error monitor circuit. Such a feed speed network is also known in the art, and may comprise a plurality of serially connected resistors. The signal from the X error monitor circuit is applied across the resistors, and a movable tap derives a portion of the signal present across the resistors. The position of the tap is determined by the feed speed signal, and hence the magnitude of the derived signal represents the signal from both the X error monitor circuit and the feed speed signal. The derived signal from the feed speed network is applied to a conventional X servo amplifier. The amplified signal from the X servo amplifier is applied to an X motor or positioning device.

In addition to the electrical circuitry just described, there are mechanical couplings indicated by the dashed lines. The mechanical output of the X motor is coupled to a conventional tachometer, the electrical output of which is fed back to the X servo amplifier to maintain the speed of the X motor at a desired level. The mechanical output of the X motor is also coupled to the rotor windings of the X selsyn or synchro transformers so as to operate or rotate the rotor windings as the X motor rotates. Also, the mechanical output of the X motor is coupled to an object, such as a bed or table of a machine tool, to provide X motion of the object by the control system. If the control system is operating properly, as the X motor moves the object toward the position called for or indicated by the control system, the object will reach its desired position at the same time that the signal induced in the X transformer rotor windings falls to zero or some value indicative of no further operation. Thus, a closed loop servo-type system, known in the art, is described. The preselected information shown in FIGURE 1 as being applied to the X synchro transformer or transformers may be in an analog voltage form and may be derived from a number of sources, such as crossbar switches and transformers having voltages set up therein by any suitable means, such as stored digital information on a perforated tape or on punched cards. When this stored information is read out, it causes the sources to produce the desired preselected information. Preselected information derived in a similar manner is also applied to the X feed speed network to adjust the output level of its signal in accordance with the desired rate of speed at which the object is to be moved.

There is, in addition to the X part of the control system just described, a similar Y part having substantially the same elements and operating in substantially the same manner. The only difference between the two parts is that the Y motion may be along a different line, usually one perpendicular to the line of the X motion. And following the same example of a machine tool table or bed, the Y motion may move a table resting on the X motion table, the Y motion table usually moving along a line that is perpendicular to the line of motion of the X table.

With the known system described so far, if it is desired that the object follow a path that forms either an angular straight line or an arc with respect to the two lines of X and Y motion, then the system may have to produce a series of small step-like motions that approximate this desired path. However, in accordance with the invention, signals are provided which eliminate the step-like motions and provide a smooth or unbroken angular or arcuate path with respect to the X and Y lines of motion. The angle and arcuate position control system in accordance with the invention (or the second part shown in FIGURE 1) comprises a sinusoidal generator and a cosinusoidal generator. The purpose of these generators is to produce sinusoidally and cosinusoidally varying signals in accordance with a drive signal. An example of such generators may be found in the form of potentiometers, such potentiometers being known in the art. Briefly, these potentiometers comprise a continuous resistance wire wound around a flat card or other insulating element to form a flat surface of closely spaced continuous wire. A shaft carrying an arm is positioned with relation to the formed surface of wire so that as the shaft is rotated, the arm contacts the formed surface of wire at a number of points which form a circle. If the positive and negative terminals of a unidirectional potential source are applied between the beginning and end of the wound wire, and if the center of the wound wire is placed at a point of reference potential, then as the arm is rotated, it receives a voltage which varies in a simple harmonic or sinusoidal manner. If the arm contacts a turn of the wire at the zero or reference potential, then as it is rotated toward the positive or negative end of the wound wire, it receives a voltage which varies as the sine of the angle through which the arm is rotated. If the arm contacts a turn of the wire at either the positive or negative end of the wound wire, then as it is rotated toward the zero or reference point of the wound wire, it receives a voltage which varies as the cosine of the angle through which the arm is rotated. If two such potentiometers are provided with their two arms fixed at angles of 90 degrees with respect to each other, and if these two arms are rotated by a common shaft, it will be seen that the voltages received by the two arms vary respectively as the sine and cosine of the angle of rotation. Furthermore, with the relative angle of 90 degrees, the ratio of these two voltages is tangential. As shown in FIGURE 1, an angle-arc servomotor is mechanically coupled to the two potentiometers and rotates or drives the two potentiometers simultaneously in accordance with the signal applied to the angle-arc servomotor. The angle-arc servomoter also drives or rotates a tachometer and the rotor winding of an angle-arc selsyn or synchro transformer. These are mechanical connections and are shown by the dotted or dashed lines. The angle-arc synchro transformer is similar in structure and function to the X and Y synchro transformers described above. The angle-arc servomotor receives its signal through a set of normally open contacts CLC–2, these contacts being coupled to the output circuit of a conventional servo amplifier, shown as an angle-arc servo amplifier in FIGURE 1. The tachometer output signal is coupled back to the angle-arc servo amplifier in a conventional manner to maintain the angle-arc servomotor at a desired speed. The input circuit of the angle-arc servo amplifier is coupled to a set of normally open contacts CLC–1, and these contacts CLC–1 are coupled in turn to a set of contacts AAR–1. The contacts CLC–1 and CLC–2 are operated in response to a circle loop contactor relay which, in turn, is energized by an angle-arc error monitor circuit. This circuit is similar to the X and Y error monitors described previously. The input circuit of the angle-arc error monitor circuit is coupled to the rotor winding of the angle-arc synchro transformer. The contacts AAR–1, as well as the contacts AAR–2 and AAR–3, are operated in response to an angle-arc relay winding which, in turn, is energized by preselected information or signals. It will be seen that the input circuit of the angle-arc servo amplifier may be coupled by the contacts AAR–1 to either the rotor winding of the angle-arc synchro transformer or to the output circuit of an arc radius selector. A preselected arc radius signal may be derived from preselected digital information and applied to the arc radius selector. An input circuit of the arc radius selector is coupled directly to the output circuit of an arc feed speed selector. Preselected information is also applied to the input circuit of the arc feed speed selector. The arc feed speed selector may be a known circuit which provides an analog signal indicative of digital preselected information applied to it. The arc radius selector may be any of the suitable known circuits such as the resistor network described in connection with the X feed speed network. The arc radius selector combines the analog arc radius signal with the analog signal from the arc feed speed selector to produce a composite or resultant signal indicated as the arc speed signal. The arc speed signal has a magnitude and characteristic such as to drive the angle-arc servomotor at the desired speed relative to the conditions in the system. The stator windings of the angle-arc synchro transformer may be coupled to one of two output circuits of an angular position preset circuit by means of arc relay contacts which are operated in response to an arc relay winding. The arc relay contacts may be arranged so that the stator windings of the angle-arc synchro transformer are normally connected to the upper or arc start signal contact, but so that when the arc relay is energized, the stator windings of the angle-arc synchro transformer are then connected to the lower or arc end signal contact. The angular position preset circuit may provide analog arc start signals and analog arc end signals at respective output circuits in response to preselected digital information applied to the angular position preset circuit. Such a circuit is known in the art, and may comprise any of the known suitable digital to analog converters.

In FIGURE 1, all of the relay contacts are shown in their normal or dropped out position. The contacts are picked up or operated in response to energization of their respective relay windings.

Circuit Operation

Operation of the angle and arcuate position control system in accordance with the invention may be considered in two parts. The first part includes angular presetting and subsequent angular straight line motions and the second part includes the same angular presetting but subsequent arcuate motion. As used herein, angular straight line motion means motion along a straight line that forms an angle with respect to the lines of X and Y motion. Under the first part, if the known or basic portion of the arrangement shown in FIGURE 1, has positioned an object at some predetermined point, and if it is desired to move the object along a straight-line path which forms an angle with respect to the lines of X and Y motion, the information for this operation is fed into the angular position preset circuit in the form of preselected digital information. As explained, this angular position preset circuit converts the preselected digital information indicating the angle desired into an alternating current signal which is applied through the upper contacts of the arc relay as an arc start signal. This signal is applied to the stator windings of the angle-arc synchro transformer, and if the rotor winding is at some position other than that called for by this signal, there is a voltage induced across the rotor winding. This induced voltage may be referred to as the angular preset signal, and is applied through the normally positioned contacts AAR–1 to the contacts CLC–1. If the angular preset signal exceeds some predetermined magnitude, the angle-arc error monitor causes the circle loop contactor relay to become energized. Energization of this relay causes the contacts CLC–1 and CLC–2 to close so that the angular preset signal is applied to the angle-arc servo amplifier. The amplified signal from the angle-arc servo amplifier is applied to the angle-arc servomotor and causes the servomotor to rotate. As the angle-arc servomotor rotates, it rotates the sine and cosine potentiometers towards the position called for by the arc start signal and the preselected information. At the same time, the servomotor also rotates the rotor winding of the angle-arc synchro transformer. As the sine and cosine potentiometers approach the desired or called-for position, the rotor winding of the angle-arc synchro transformer also approaches the position at which no voltage is induced in it. When the sine and cosine potentiometers are at their desired or called-for position, the rotor winding of the angle-arc synchro transformer should also be at a position at which no voltage is present across or induced in it. Hence, the angle-arc servo amplifier and servomotor receive no further signal, and the sine and cosine potentiometers are rotated no further. Also, when the voltage across the rotor winding of the angle-arc synchro transformer falls to zero, no signal is applied to the angle-arc error monitor. The circle loop contactor relay becomes deenergized, and the contacts CLC–1 and CLC–2 drop out so that the angle-arc servo amplifier and servomotor receive no further signal. Thus, the angular preset signal effects the positioning of the sine and cosine potentiometers for angular straight line motion. The potentiometers remain in this position until a new angle is called for.

With the sine and cosine potentiometers in the desired or called-for position, the angle-arc relay winding is then energized by preselected information. Upon energization of the angle-arc relay winding, the contacts AAR–1, AAR–2, and AAR–3 are picked up. The fact that the contacts AAR–1 are picked up does not perform any function in this operation, as the contacts CLC–1 are open at this time. However, when the contacts AAR–2 and AAR–3 are picked up, the X and Y feed speed networks are respectively coupled to the cosine and sine potentiometers. Also at this time, preselected information indicative of the terminal or end point of the angular motion may be applied to the X and Y synchro transformers. This information, when passed through the X and Y mixers and discriminators to the respective X and Y error monitors, causes the X and Y motion feed signal relays to become energized, thus coupling the X and Y feed speed networks to their respective X and Y servo amplifiers. It will thus be seen that the two steady-state voltages across the now fixed cosine and sine potentiometers are applied to the X and Y feed speed networks, and the output signals from the X and Y feed speed networks are applied to the X and Y servo amplifiers. Thus, the X and Y motors are energized to provide a smooth, straight line resultant motion in an angular direction determined by the respective voltages on the cosine and sine potentiometers. As the object moved by the X and Y motors approaches the desired terminal or end point called for by the preselected information applied to the X and Y synchro transformers, the magnitudes of the signals across the rotor windings of the X and Y synchro transformers approaches zero. Under ideal conditions, the signals provided by the cosine and sine potentiometers cause the object to approach its desired terminal or end point at the same time that the voltage across the rotor windings of the X and Y synchro transformers approaches zero. As the voltages across the rotor windings of the X and Y synchro transformers fall below a certain predetermined level, the respective X and Y error monitors permit or cause their respective motion feed signal relays to become deenergized so that the X and Y servo amplifiers no longer receive their signals from the X and Y feed speed networks. And, when the motion feed signal relays are deenergized, the X and Y servo amplifiers are coupled directly to the X and Y error monitors and the X and Y feed speed networks are bypassed. Thus, final positioning is done in accordance with signals from the respective X and Y synchro transformers. This feature, while optional, may be used to provide either a relatively slow or a relatively rapid movement of the object as it approaches the desired or called-for position. In the examples to be discussed, it is assumed that as the object approaches the desired or called-for position, a relatively slow movement is provided so as to prevent any overshoot. At this stage, the angle-arc relay may be deenergized, with the result that the X and Y feed speed networks are no longer coupled to the cosine and sine potentiometers. However, the X and Y motion feed signal relays may be deenergized prior to this deenergization of the angle-arc relay, so that final positioning may be accomplished in accordance with signals directly from the X and Y error monitors.

FIGURE 2a shows in graphic form several possible angular straight line paths followed by the system under the first part of the operation just described. In FIGURE 2a, the starting point is indicated by the coordinates $X_1$, $Y_1$, and the desired or called-for terminal point is indicated by the coordinates $X_2$, $Y_2$. The dashed lines associated with the X and Y coordinates represent (not to scale) the points or coordinates at which the X and Y feed speed networks may be bypassed by deenergization of the X and Y motion feed signal relays. These coordinates may be adjusted as desired. In other words, for a terminal point having the coordinates $X_2$, $Y_2$, when either of the coordinates representing the X and Y feed speed bypass condition are reached by the object, the respective X or Y motion feed signal relay is deenergized. The curve 10 shows the ideal or desired path which would be followed if the system were operating to a normal degree of accuracy. The path represented by the curve 10 may reach both the X and Y feed speed bypass coordinates at approximately the same time. The curve 12 shows the path which might be followed if the Y motion were faster than that needed with respect to the associated X motion. Thus, it will be seen that the path represented by the curve 12 reaches the Y feed speed bypass coordinate before it reaches the X feed speed bypass coordinate. Under this condition, the Y feed speed network, and hence the signal from the sine potentiometer, is bypassed, and the Y motion is completed from the Y error monitor. This Y motion is assumed to be relatively slow in comparison to the normal feed speed network motion. Hence, the path represented by the curve 12 slopes considerably as shown until the desired point $X_2$, $Y_2$ is reached. The curve 14 shows a path which might be followed if the X motion were faster than that needed with respect to the associated Y motion. It will be seen that the path represented by the curve 14 reaches the X feed speed bypass coordinate before it reaches the Y feed speed bypass coordinate. Hence, the X motion is slower once this coordinate is reached so that the path represented by the curve 14 slopes as shown until the desired point $X_2$, $Y_2$ is reached.

When it is desired that the object follow an arcuate path, the operation includes the angular presetting already described followed by subsequent arcuate motion. In this case, the angular preset signal sets an angle which would provide a tangent to the arc at the initial point. The arcuate motion may follow a path which is the arc of a circle or which is an arc of some other nature such as a parabola. An arc of a circle requires a constant radius signal to be supplied while the arc of some other type requires a varying radius signal to be supplied. Thus, for arcuate motion it is necessary that the radius or radii of the arc, as well as the location of the desired terminal or end point, be known. This radius information is supplied to the system at the arc radius selector as preselected information. It is also necessary that the radius or radii of the arc be known because the feed speed of the X and Y motions may be varied depending upon the work to be done. Thus, if the object being moved is a tool which must cut through hard steel, it is desirable that the resultant feed speed be less than if the object being moved is a tool cutting through relatively soft aluminum. In the control system of the invention, the radius or radii of the arc being followed varies directly as the resultant feed speed and inversely as the speed of angular rotation of the potentiometers. This will be understood from the following explanation. For example, if a preselected feed speed provides a resultant motion speed of say 100 inches per minute along the arc being followed, then in one minute an object will be moved 100 inches. If, for the constant speed of 100 inches per minute, the potentiometers are angularly rotated at a speed of 5 revolutions per minute, a radius of $$\frac{100 \text{ inches}}{5 \times 2 \times \pi}$$

or 3.18 inches would be provided. If the speed of angular rotation of the potentiometers is increased to 10 revolutions per minute, a radius of 1.59 inches would be provided. Likewise, if the speed of angular rotation of the potentiometers is maintained constant and if the resultant feed speed is increased, it will be appreciated that the radius of the arc being followed will also be increased. The resultant feed speed is applied to the system in the form of preselected information at several places, namely at the arc feed speed selector, and at the X and Y feed speed networks.

As previously explained, the angular position preset circuit has preselected information applied to it to indicate, by the arc start signal, the initial direction of an angular straight line path that is tangent to the arc at the initial or starting point. Thus, the preselected information applied to the angular position preset circuit indicates, by the arc start signal, the initial direction of an arcuate path. Subsequently, the angular position preset circuit has preselected information applied to it to give (in the form of the arc end signal) the location or coordinates of the point at which the arcuate path ends. If desired the arc end signal could also be used in an angular straight line path operation. When the arc start signal is applied to the angle-arc synchro transformer, an angular preset signal appears at the rotor winding of the angle-arc synchro transformer. This signal causes the angle-arc error monitor to energize the circle loop contactor relay and close the contacts CLC-1 and CLC-2. With these contacts CLC-1 and CLC-2 picked up or closed, the angle-arc servo amplifier applies the angular preset signal induced in the rotor winding of the angle-arc synchro transformer to the angle-arc servomotor. The angle-arc servomotor rotates the rotor winding of the angle-arc synchro transformer and the two potentiometers toward the desired initial position. When the desired initial position is reached, the angular preset signal falls to substantially zero so that the circle loop contactor relay is deenergized, thus opening the contacts CLC-1 and CLC-2. Subsequently, additional preselected information is applied to the angular position preset circuit to indicate, by the arc end signal, the location or coordinates of the point at which the arcuate path ends. Similarly, preselected information is applied to the X and Y synchro transformer to indicate the location or coordinates of the point at which the arcuate path ends. This information induces a signal across the rotor windings of the X and Y synchro transformers so that the X and Y error monitors energize the X and Y feed signal relays to couple the X and Y servo amplifiers to their respective X and Y feed speed networks. Subsequently, the arc relay is energized and the arc end signal is applied to the angle-arc synchro transformer. Since the angle-arc synchro transformer rotor winding is at the position called for by the arc start signal, the angle-arc error monitor energizes the circle loop contactor relay which picks up or closes the contacts CLC-1 and CLC-2. At substantially the same time that the arc relay is energized, the angle-arc relay is also energized and picks up contacts AAR-1, AAR-2, and AAR-3. Thus, the arc speed signal is applied through the contacts AAR-1 and CLC-1 to the angle-arc servo amplifier. The signal from the angle-arc servo amplifier is applied through the contacts CLC-2 to the angle-arc servomotor. The angle-arc servomotor rotates the sine and cosine potentiometers and the rotor winding of the angle-arc synchro transformer at an angular speed determined by the arc speed signal. While the angle-arc servomotor rotates, the signals or voltages from the sine and cosine potentiometers are applied through the contacts AAR-2 and AAR-3 to the X and Y feed speed networks. The signals from the X and Y feed speed networks are applied through the contacts of the energized X and Y motion feed signal relays and through the X and Y servo amplifiers to the X and Y motors which provide the X and Y motion desired.

Since the signals from the rotating sine and cosine potentiometers are varying sinusoidally and cosinusoidally respectively, the resultant of the X and Y motions forms an arcuate path. As already explained, the radius of this arcuate path is determined by the preselected information applied to the arc feed speed selector and to the arc radius selector, and the preselected information applied to the X and Y feed speed networks. As the path approaches the desired terminal or end point, the signal induced in the rotor winding of the angle-arc synchro transformer by the arc end signal approaches zero. As this signal approaches zero, a point will be reached at which the circle loop contactor relay is deenergized to open or drop out the contacts CLC–1 and CLC–2. At substantially the same time that the contacts CLC–1 and CLC–2 are opened, the angle-arc relay drops out or is deenergized to open the contacts AAR–1, AAR–2, and AAR–3. Also, as the desired terminal or end point is approached, the signals derived from the rotor windings of the X and Y synchro transformers approach zero. When the signals from the X and Y error monitors fall below a predetermined level, the X and Y motion feed signal relays drop out so that the X and Y servo amplifiers are coupled directly to the X and Y error monitors. Final positioning is attained in accordance with the signals from these circuits.

It may be pointed out that the sequence of relay operation may be set up to provide any desired performance. In the sequence just described, it has been assumed that the time delays of sequential relay operation may be neglected. Also, the arrangement just described limits arcuate motion to an angle of 90 degrees in any one step. This limitation results from the fact that if more than 90 degrees is traveled, either the called for X position or the called for Y position may be satisfied or reached by an ambiguous point in the path of travel before the actual X and Y position is reached. However, it is possible to eliminate this limitation if the arc end signal and the called-for X and Y positions are withheld until the point of ambiguity is passed by the path of travel.

FIGURE 2b shows several curves illustrating paths of arcuate motion which may be provided by the system of the invention. The curve 20 shows an ideal path between an initial point having coordinates $X_1$, $Y_1$ and a desired or called-for terminal point having the coordinates $X_2$, $Y_2$. It will be seen that the curve 20 reaches both the X and Y feed speed bypass coordinates at the same time. When these coordinates are reached, final positioning is done in response to signals from the X and Y error monitors. Hence, the last portion of this curve 20 represents a straight line but the length of this straight line is sufficiently short as to create no appreciable inaccuracy. The two curves 22, 24 show paths which are followed when the Y feed speed is relatively high with respect to the X feed speed, and when the X feed speed is relatively high with respect to the Y feed speed, respectively. With respect to the curves 22, 24, it has been assumed that the arc end signal is satisfied after the desired point $X_2$, $Y_2$ or one of the feed speed bypass coordinates has been reached. That is, it has been assumed that when either of the X and Y motion feed signal relays switches its respective X or Y servo amplifier to the respective X or Y error monitor, the signal induced in the rotor winding of the angle-arc synchro transformer by the arc end signal is still of a sufficient magnitude to keep the circle loop contactor relay energized so that the sine and cosine potentiometer are still being rotated. A different situation will be explained hereinafter. The gradual slopes of the curves 22, 24 in the vicinity of the X and Y feed speed bypass coordinates result from one of the X and Y motion feed signal relays being deenergized as explained in connection with FIGURE 2a. The curve 26 shows an example of the path followed when the arc end signal is satisfied before either the X or Y feed speed bypass coordinates is reached. That is, the signal induced in the rotor winding of the angle-arc synchro transformer by the arc end signal has fallen below a predetermined magnitude before either the X or Y feed speed bypass coordinates is reached. The point 28 on the curve 26 is assumed to represent the location of the path at the time the arc end signal is satisfied. When the arc end signal is satisfied, the signal induced in the rotor winding of the angle-arc synchro transformer becomes sufficiently low so that the angle-arc error monitor deenergizes the circle loop contactor relay and the sine and cosine potentiometers no longer rotate. Also at this time, the angle-arc relay is deenergized to drop out contacts AAR–2 and AAR–3. Thus the X and Y feed speed networks are coupled to the X and Y error monitors. Since the preselected information applied to the X and Y feed speed networks calls for substantially the same feed speeds in the X and Y directions, the curve 26 follows a path having a slope of 45 degrees until either the X or Y feed speed bypass coordinates is reached. In the case illustrated by the curve 26, the Y feed speed bypass coordinate is reached first. Once this Y feed speed bypass coordinate is reached, the Y servo amplifier and motor are coupled directly to the Y error monitor and may provide a slower feed speed than do the X servo amplifier and motor which are still receiving preselected information through the X feed speed network. However, once the desired point having the coordinates $X_2$, $Y_2$ is reached, the X and Y synchro transformers no longer provide a signal and the X and Y motors are stopped.

As previously explained, the radius of the arc which is followed may be varied by varying the feed speed or by varying the angular speed of rotation of the sine and cosine potentiometers. If, for a given set of conditions, the feed speeds and the angular rotational speeds of the sine and cosine potentiometers are held constant, an arc of constant radius will be provided. However, if, while an arc is being followed, either the feed speeds or the speed of angular rotation is varied, an arc of other than circular configuration may be provided. Thus, in addition to providing circular arcs, the position control system in accordance with the invention can provide arcs of almost any configuration desired.

While the invention has been described in the form of one preferred embodiment as used with a particular X and Y motion position control system, it will be appreciated by persons skilled in the art that modifications of the invention may be made, and that the invention may be used in a number of different types of position control systems without departing from the spirit of the invention or from the scope of the claims.

What we claim as new and desire to secure by Letters Patent of the United States is:

1. In a system for controlling the movement of an object in two directions, an angle and arc control system comprising a generator that produces a sinusoidally varying signal when driven, a generator that produces a cosinusoidally varying signal when driven, said generators being arranged so that the ratio of their signals is tangential, a position sensitive device that produces an output signal in response to an input signal, said output signal varying in accordance with the position of said position sensitive device, drive means coupled to said generators and to said position sensitive device for simultaneously driving said generators and said position sensitive device in response to an applied signal, an arc cutting signal source for producing predetermined arc cutting signals, and means for alternatively and selectively coupling said position sensitive device and said arc cutting signal source to said drive means for controlling the operation of said drive means.

2. In a system for controlling the movement of an object in two directions, an angle and arc control system comprising a generator that produces a sinusoidally varying signal when driven, a generator that produces a cosinusoidally varying signal when driven, said generators being arranged so that the ratio of their signals is tangential, drive means coupled to said generators for simultaneously driving said generators, an arc start signal source, an arc cutting signal source, and means for alternatively and selectively coupling said arc start signal source and said arc cutting signal source to said drive means for controlling the operation of said drive means.

3. In a system for controlling the movement of an object in two directions, an angle and arc control system comprising a generator that produces a sinusoidally varying signal when driven, a generator that produces a cosinusoidally varying signal when driven, said generators being arranged so that the ratio of their signals is tangential, a position sensitive device that produces an output signal in response to an input signal, said output signal varying in accordance with the position of said position sensitive device, drive means coupled to said generators and to said position sensitive device for simultaneously driving said generators and said position sensitive device in response to an applied signal, an arc start signal source, means coupling said arc start signal source to said position sensitive device for applying said input signal to said position sensitive device, an arc cutting signal source, and means for alternatively and selectively coupling said position sensitive device and said arc cutting signal source to said drive means for controlling the operation of said drive means.

4. In a system for controlling the movement of an object in two directions, an angle and arc control system comprising a generator that produces a sinusoidally varying signal when driven, a generator that produces a cosinusoidally varying signal when driven, said generator being arranged so that the ratio of their signals is tangential, drive means coupled to said generators for simultaneously driving said generators in response to an applied signal, an arc start signal source, an arc end signal source, and means for alternatively and selectively coupling said arc start signal source and said arc end signal source to said drive means for controlling the operation of said drive means.

5. In a system for controlling the movement of an object in two directions, an angle and arc control system comprising a generator that produces a sinusoidally varying signal when driven, a generator that produces a cosinusoidally varying signal when driven, said generators being arranged so that the ratio of their signals is tangential, a position sensitive device that produces an output signal in response to an input signal, said output signal varying in accordance with the position of said position sensitive device, drive means coupled to said generators and to said position sensitive device for simultaneously driving said generators and said position sensitive device in response to an applied signal, means coupling said position sensitive device to said drive means for applying said output signal to said drive means and controlling the operation of said drive means, an arc start signal source, an arc end signal source, and means for alternatively and selectively coupling said arc start signal source and said arc end signal source to said position sensitive device for applying said input signal to said position sensitive device.

6. In a system for controlling the movement of an object in two directions, an angle and arc control system comprising a generator that produces a sinusoidally varying signal when driven, a generator that produces a cosinusoidally varying signal when driven, said generators being arranged so that the ratio of their signals is tangential, a position sensitive device that produces an output signal in response to an input signal, said output signal varying in accordance with the position of said position sensitive device, drive means coupled to said generators and to said position sensitive device for simultaneously driving said generators and said position sensitive device in response to an applied signal, an arc start signal source, an arc end signal source, means for alternatively and selectively coupling said arc start signal source and said arc end signal source to said position sensitive device, an arc cutting signal source, and means for alternatively and selectively coupling said arc cutting signal source and said position sensitive device to said drive means and controlling the operation of said drive means.

References Cited in the file of this patent

UNITED STATES PATENTS 2,784,359    Kamm _____ Mar. 5, 1957

UNITED STATES PATENT OFFICE
CERTIFICATE OF CORRECTION

Patent No. 3,035,216            May 15, 1962

John M. Rhoades et al.

It is hereby certified that error appears in the above numbered patent requiring correction and that the said Letters Patent should read as corrected below.

Column 11, lines 32 and 33, for "generator" read -- generators --.

Signed and sealed this 9th day of October 1962.

(SEAL)
Attest:

ERNEST W. SWIDER
Attesting Officer

DAVID L. LADD
Commissioner of Patents